United States Patent
Guminski

(10) Patent No.: US 7,320,421 B2
(45) Date of Patent: Jan. 22, 2008

(54) HUNTING RETENTION SYSTEM AND METHOD

(75) Inventor: Jeromie Guminski, South Haven, MI (US)

(73) Assignee: David B. Hadley, Paw, Paw, MI (US)

( * ) Notice: Subject to any disclaimer, the term of this patent is extended or adjusted under 35 U.S.C. 154(b) by 34 days.

(21) Appl. No.: 10/390,237

(22) Filed: Mar. 17, 2003

(65) Prior Publication Data

US 2003/0178454 A1 Sep. 25, 2003

Related U.S. Application Data

(60) Provisional application No. 60/366,469, filed on Mar. 19, 2002.

(51) Int. Cl.
*A45F 3/04* (2006.01)
*A45F 5/00* (2006.01)
*F41C 33/02* (2006.01)
*F42B 39/02* (2006.01)

(52) U.S. Cl. .................. 224/268; 224/260; 224/666

(58) Field of Classification Search ............... 224/162, 224/260, 268, 660, 663, 665–669, 913; 2/312, 2/319, 338
See application file for complete search history.

(56) References Cited

U.S. PATENT DOCUMENTS

| 304,446 A | * | 7/1884 | Taylor ..................... 224/663 |
| 1,468,991 A | | 9/1923 | Butner .......................... 2/94 |
| 2,643,803 A | * | 6/1953 | Bates ........................ 224/254 |
| 3,371,351 A | * | 3/1968 | Allain .......................... 2/338 |
| 3,653,075 A | | 4/1972 | Gluckin et al. ................ 2/338 |
| 3,908,875 A | * | 9/1975 | Wilson et al. ............. 224/254 |
| 4,139,130 A | * | 2/1979 | Glusker et al. .......... 224/148.2 |
| 4,884,730 A | * | 12/1989 | Carpenter .................. 224/162 |
| 5,299,324 A | * | 4/1994 | Zinna ............................ 2/312 |
| 5,632,428 A | * | 5/1997 | Weiss ........................ 224/623 |
| 5,806,087 A | * | 9/1998 | Grotefend ....................... 2/1 |
| 5,816,458 A | * | 10/1998 | Yonenoi ..................... 224/182 |
| 5,970,517 A | * | 10/1999 | Jordan ........................... 2/69 |
| 6,530,131 B1 | * | 3/2003 | Hopkins ....................... 24/300 |
| 2003/0102346 A1 | * | 6/2003 | Chen .......................... 224/675 |

* cited by examiner

*Primary Examiner*—Sue A. Weaver
(74) *Attorney, Agent, or Firm*—Price, Heneveld, Cooper, DeWitt & Litton

(57) ABSTRACT

A hunting retention system includes an elastic cord attached to each of the pair of rattling antlers and attached by a unique and novel attachment device to a user at the waist. Preferably, the restraining device takes the form of a belt, wherein an elastic cord extends on either side of the belt through eyelets externally of the belt so that the same can be attached to each end of one of the antlers of the pair of antlers. The elastic cord is looped through a metal ring lock, which is in turn attached to the antler. Proximate to the eyelet, a latch is attached to and retains the metal ring lock proximate to the user in all circumstances.

18 Claims, 3 Drawing Sheets

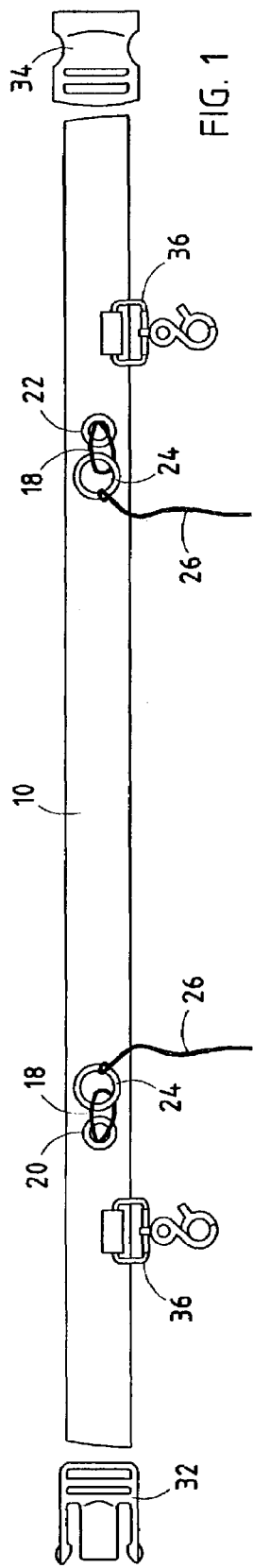
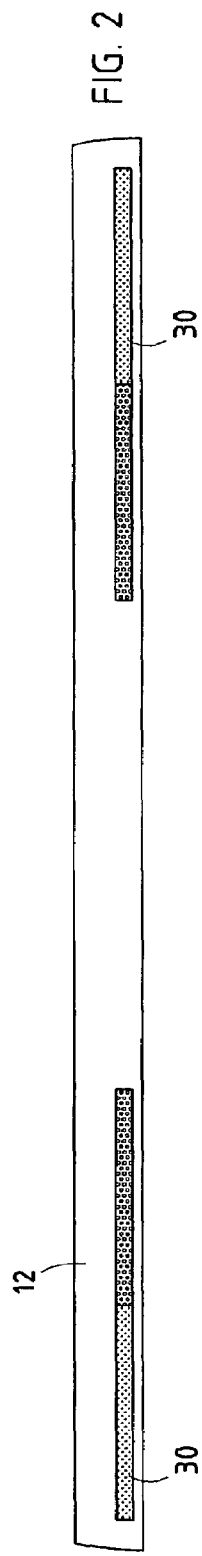
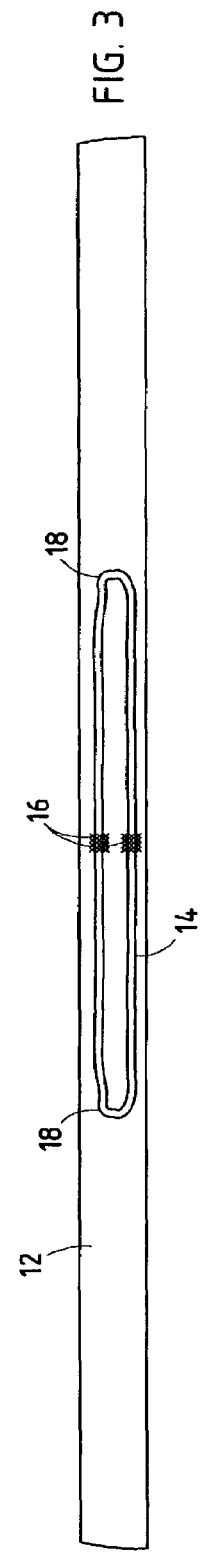
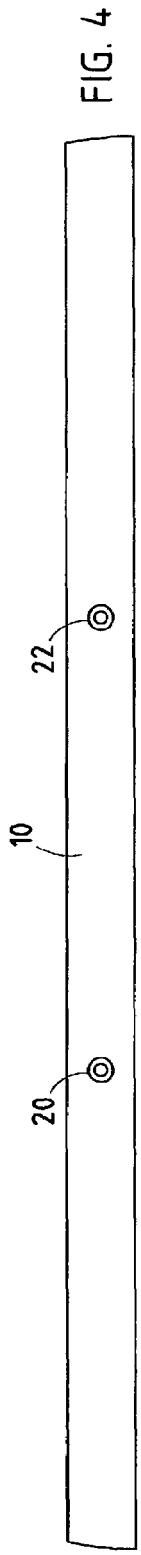
FIG. 1
FIG. 2
FIG. 3
FIG. 4

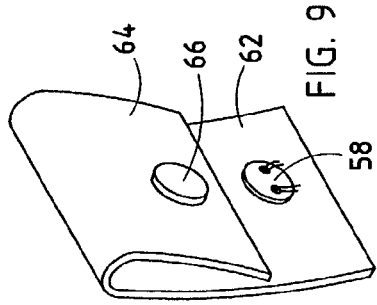
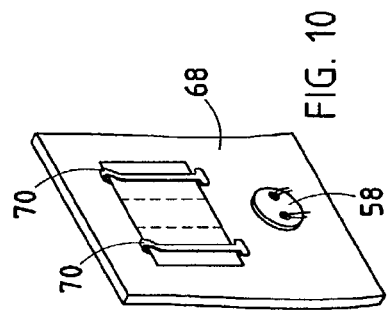
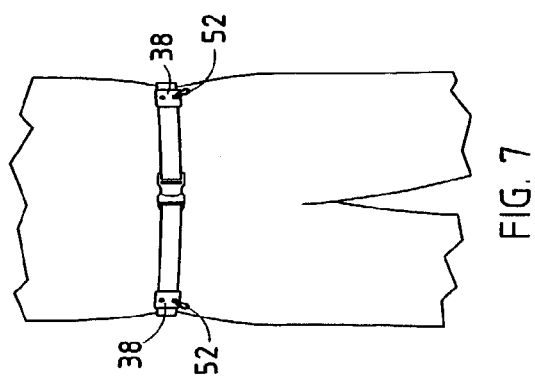
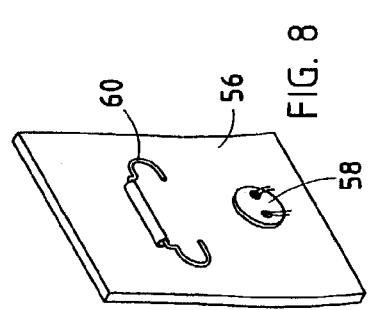
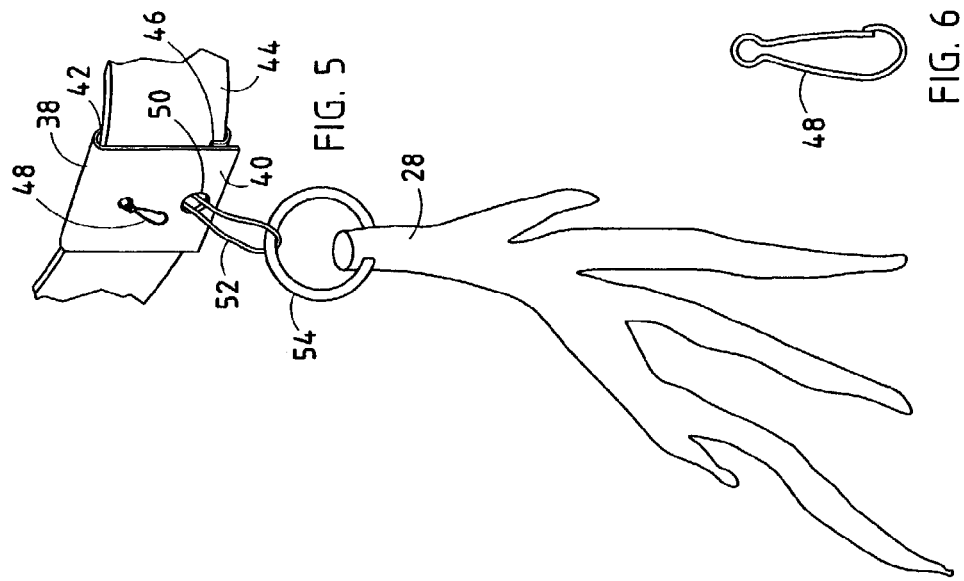

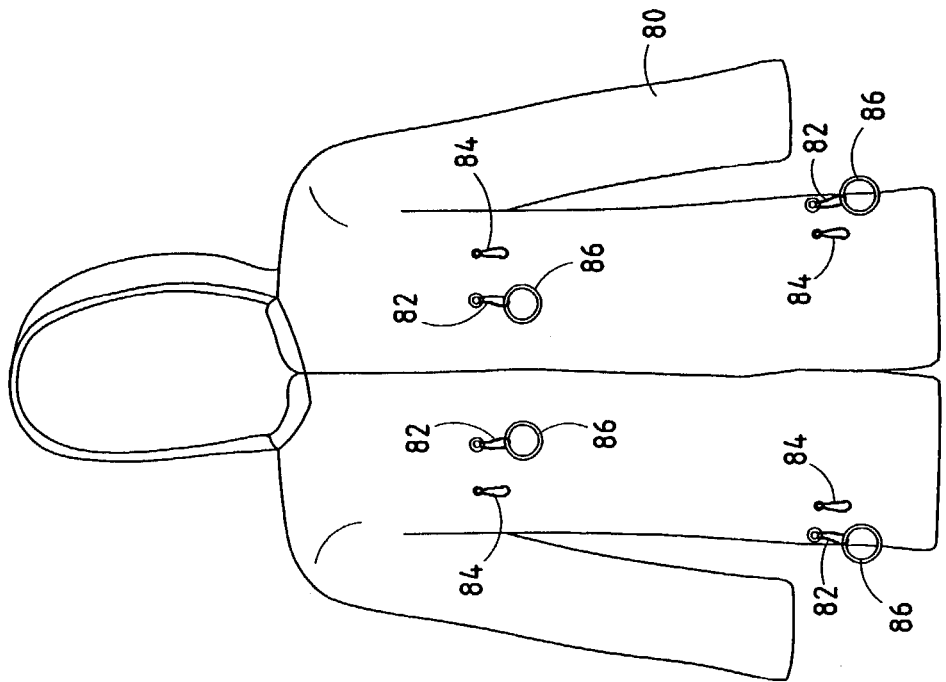
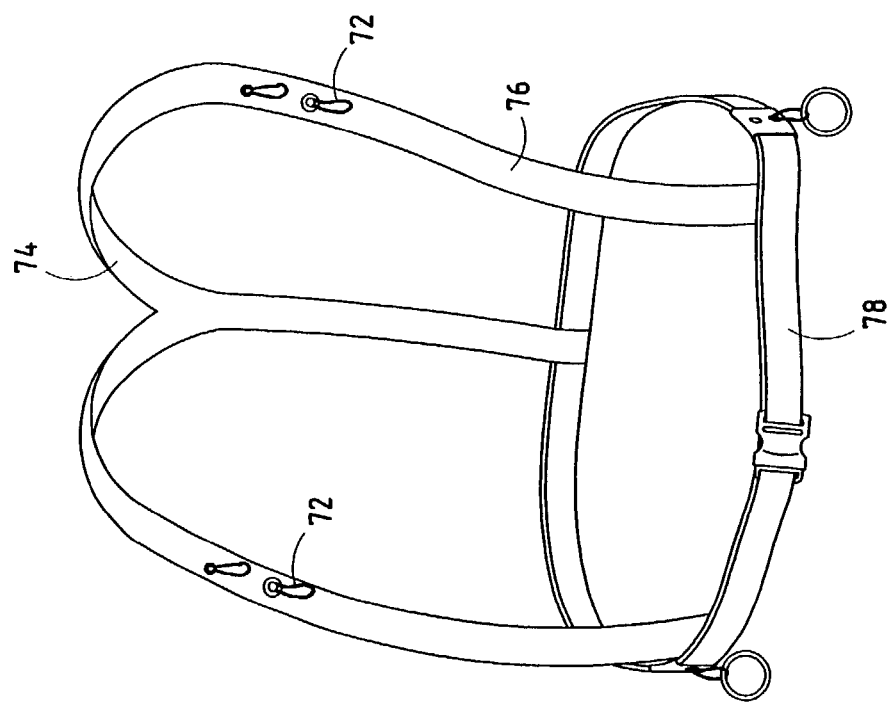

HUNTING RETENTION SYSTEM AND METHOD

CROSS-REFERENCE TO RELATED APPLICATION

This application claims the benefit of U.S. Provisional Application No. 60/366,469, filed Mar. 19, 2002, entitled HUNTING RETENTION SYSTEM AND METHOD, which is hereby incorporated herein by reference in its entirety.

The present invention relates to a system and method for retaining a big game attractant device. More particularly, the present invention relates to a system and method whereby a game calling device, such as a pair of rattling antlers, can be deployed, such that the same are ready for use by a hunter, but are maintained separate and apart from each other to minimize noise and other unwanted distractions.

BACKGROUND OF THE INVENTION

In North America, as well as elsewhere, there are at least 27 big game species that are regularly hunted by sportsmen. With regard to big game, such as deer, moose, and caribou, it is common to attempt to attract the game to a blind or other location for the purpose of harvesting the game. Many approaches are available for attracting such game, including scents, decoys, and bait. Further devices include calls, such as a doe bleat and a buck grunt/snort, which are designed to primarily attract a buck or other large male of the species for harvest. Also commonly used is a pair of previously harvested antlers from the big game at issue, which are "rattled" one against another so as to simulate the sound of two bucks in combat over territory and/or a female of the species. Such rattling approaches have particularly been found to be useful during the rut, or that week or two-week period in the fall when the game are most active.

While many of the attractants described above have their own uses and advantages, the use of rattling antlers has been problematic heretofore. Particularly, when entering the woods prior to a hunt, it is difficult to secure the antlers in such a way that they are not snagged by branches or twigs, lost by the hunter. Moreover, the hunter travelling through the woods with the antlers proximate to each other can likewise occasionally create interaction and undesired noise, thereby revealing the location and/or presence of the hunter prior to the hunt. Such can cause the game to become more suspicious and possibly cause the game to leave the hunting area altogether.

Also, even if the hunter is successful in getting to the hunt area or blind with the rattling antlers, it is sometimes awkward to maintain ready access to the antlers for purposes of rattling during the hunt. Also, it is not uncommon that after a game has been sighted, it is necessary to quickly and discreetly put away the rattling antlers so that the bow and/or firearm can be acquired and the game harvested. It is quite difficult to discard the rattling antlers in such a discreet manner that the game is not otherwise alerted with some game, such as, for example, North American whitetail deer, which have heightened senses, including smell, sound, and sight. Accordingly, a need has existed for an improved rattling deployment and retaining system for use during hunting of big game animals.

SUMMARY OF THE INVENTION

The aforementioned drawbacks and disadvantages of rattling systems have been identified and a solution is set forth herein in the invention in a rattling system and method that includes an elastic cord attached to each of the pair of the rattling antlers and attached by a unique and novel attachment device to a belt of the hunter at the side waist of the hunter on respective sides. Preferably, the restraining device includes a carrier that takes the form of a belt having inner and outer layers, wherein an elastic cord is fixed to the inner layer and extends on either side of the belt through eyelets externally of the belt so that the same can be attached to each end of one of the antlers of the pair of antlers. An eyelet is provided on either side to provide a smooth and robust opening for the elastic cord. The elastic cord is looped through a metal ring lock, which is in turn attached to a string that is then secured to the antler. Proximate to the eyelet, a latch is provided on the outside of the belt, whereby the latch can be attached to and retain the metal ring lock proximate to the belt in all circumstances.

During the hunting event, the latch is disengaged from the metal ring lock, allowing the elastic cord to be extended from the inside of the belt through the eyelet and out in front of the hunter so that each of the respective pair of rattling antlers can be brought into cooperating relationship and thereby used to simulate the sound of, for example, bucks fighting. In the event that game is sighted, the hunter can simply let go of the antlers, which will then be separated one from the other and brought to a position proximate the waist at each side of the hunter. Thus, the antlers would no longer be in a position to present any distraction to the game, but yet remain accessible to the hunter for further use, if necessary. When the latches are attached, that is, when the latch is engaged with the metal ring lock, the antlers are kept at each side of the hunter close to the hunter's side and twigs and branches are prevented from disengaging the antlers from the elastic cord.

Preferably, the belt is provided with a Velcro strap on the external portion of the outside surface so that a male end and female end of a buckle, respectively, can be looped through each end of the belt and brought back and secured in position through the use of the Velcro strap attached to the external portion of the belt. Thus, the belt can be extended to whatever length necessary for the waistline of the hunter, but yet kept relatively secure and snug so noise and looseness can be avoided. The buckles are preferably polymeric snap buckles having economical advantages.

Alternatively, the present system can employ a carrier that includes a pair of metal clips through which an elastic cord extends and to which the elastic cord is attached, each of the metal clips having a hole through which the cord extends. The cord is secured to the end of the antler through a metal lock ring as described above. Also, a latch is attached to the metal clip proximate to the hole for the elastic cord and is situated to likewise secure the lock ring proximate to the metal clip when the antler is not needed for rattling. The metal clip is preferably U-shaped and has a lower curve portion that secures to and around a conventional belt. Thus, each side of the hunter can be provided with these detachable belts without having to provide an entire belt system. Likewise, a separate system can include a multitude of different fastening devices to a belt, such as the C-clips used in military web style belts, a snap enclosure system, as is known, as well as keeper systems, likewise used in military belts.

The carrier of the present system can be combined with suspender type units, such as load-bearing equipment ("LBE") commonly used in military applications, where a similar elastic loop and latch is provided proximate the chest at each side of the wearer for additional devices, such as doe bleats and buck grunts.

Finally, it is contemplated that the carrier of the present system can be incorporated into hunting garments altogether, that is, a hunting coat where the elastic cord and the latch are made available externally to the garment and on at least either side of the waist and preferably at each chest side for use in restraining the attracting devices described above.

Other objects, advantages and features of the invention will become apparent upon a consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the construction and the arrangements set forth in the following description or illustrated in the drawings. The hunting retention system and method of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers and practitioners in the art who are not familiar with the patent or legal terms of phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other objects, along with the various features and structures that characterize the invention, are pointed out with particularity in the claims annexed to and forming a part of this disclosure. For a better understanding of the hunting retention system and method of the present disclosure, its advantages and the specific objects attained by its uses, reference should be had to the accompanying drawings and descriptive matter in which there are illustrated and described the preferred embodiments of the invention.

While embodiments of the hunting retention system and method are herein illustrated and described, it is to be appreciated that various changes, rearrangements and modifications may be made therein, without departing from the scope of the invention as defined by the appended claims.

BRIEF DESCRIPTION OF THE DRAWINGS

FIG. 1 discloses the external surface of the outer layer of the hunting retention system of the present invention;

FIG. 2 discloses the external surface of the inner layer of the hunting retention system of the present invention;

FIG. 3 discloses the interior surface of the inner layer of the hunting retention system of the present invention;

FIG. 4 discloses the external surface of the outer layer of the hunting retention system of the present invention;

FIG. 5 discloses an alternative embodiment of the hunting retention system of the present invention;

FIG. 6 discloses the latch for the metal locking ring for the hunting retention system of the present invention;

FIG. 7 discloses the alternative embodiment of the hunting retention system of the present invention, as affixed to a conventional belt of a wearer;

FIG. 8 discloses a C-type clip for use with yet another embodiment of the present invention;

FIG. 9 discloses a snap attachment mechanism for use with the hunting retention system of the present invention;

FIG. 10 discloses a keeper attachment system of use with the hunting retention system of the present invention;

FIG. 11 discloses still another alternative embodiment of the hunting retention system of the present invention; and FIG. 12 discloses yet a further embodiment of the hunting retention system of the present invention.

DETAILED DESCRIPTION OF PREFERRED EMBODIMENT

The best mode for carrying out the invention is presented in terms of the preferred embodiment, wherein similar reference characters designate corresponding features throughout the several figures of the drawings.

The drawbacks and disadvantages of the prior art are overcome through the hunting retention system of the present invention, wherein the preferred embodiment is disclosed specifically in FIGS. 1-4. As better seen in FIG. 1, the hunting retention system of the present invention includes a polymer web belt having an inner layer and an outer layer. The external surface of the outer layer being shown in more detail in FIG. 1. The outer layer 10 is attached to the inner layer 12 along its edge by seams as are commonly known in the art. Attached to the inner surface of the inner layer 12 is an elastic band 14. The elastic band 14 is comprised of a continuous elastic band, preferably a shock cord type of material, which is stitched in place alongside its middle length at stitching 16, as shown in FIG. 3. The elastic band 14 has a pair of distal ends 18 created by the attachment of the elastic band 14 to the inner surface of the inner layer of the belt. As better seen in FIG. 1, an eyelet 20 and 22 are provided approximately one-third of the length of the belt, at approximately one-third of the length in from each side of the belt, through which extends the respective distal ends 18 of the elastic band 14. Each distal end 18 of the elastic band is attached to a metal ring lock 24, to which in turn is attached a string 26 that can be advantageously used to attach to the end of the antler 28, for example, as that shown in FIG. 5.

The outside surface of the inner layer is also provided with a pair of Velcro strips 30, which are attached at either end, as best shown in FIG. 2. Male end buckle 32 and female end buckle 34 can be attached to the end of the belt, which is then doubled back and then brought back so that the Velcro will attach to itself and thereby secure the male end and female end of the buckle 32 and 34, respectively, at each end of the belt to the belt and allow the belt length to be infinitely adjusted. Preferably, the belt length initially is at least 55½ inches long. Likewise, the eyelets 20 and 22 are preferably disposed respectively at 19 inches from either end of the belt. The length of the relaxed elastic band 14, as shown in FIG. 3, is preferably 21 inches. Proximate to and disposed adjacent with the eyelets 20 and 22 are a pair of latches 36, as best shown in FIG. 1. As described above, the latches 36 for metal rings should be fixedly attached to the external surface of the outer layer of the belt and disposed so that they may each conveniently engage and retain the metal ring lock 24 to prevent undesired motion of the antler relative to the user's belt during ingress to and egress from the desired hunting locale. However, the latch 36 for metal rings should be easily manipulated, such that when needed, the hunter can readily detach the latch 36 from the metal ring lock 24 and thereby free the distal end 18 of each of the elastic cords for free use of the hunting retention system.

As shown in FIG. 5, an alternative embodiment is contemplated by the present invention and includes a metal clip 38, having a front portion 40 and a rear portion 42. The rear portion 42 is designed to engage a conventional belt 44 of a user and is preferably provided with a lip 46 for engaging the belt and maintaining the metal clip 38 in position. A latch 48 is fixedly attached to the metal clip 38 and is disposed proximate an orifice 50, extending through the front portion 40 of the metal clip 38. Extending through the orifice 50 is a loop of elastic cord 52, which is secured behind the front portion 40 of the metal clip 38 and is restrained thereto. The elastic cord 52 likewise engages a lock ring 54, which, as described above, is engaged by the latch 48 when it is desired that the antler be maintained proximate the user's side. Again, as before, when the user desires to deploy the antler, the user can simply detach latch 48 from the lock ring 54 and thereby free the antler for use. Preferably, a pair of the clips 38 is disposed on each side of the user, as shown in FIG. 7, The rattling retention system of the present invention can also use clip-on devices to a user's belt that are not metal but are rather constructed of alternative materials. As shown in FIGS. 8, 9, and 10, approaches have been conceived that allow a multitude of different attachment mechanisms to either a military web belt or a conventional belt of the user. As shown in FIG. 8, the rattling retention system includes a base 56 made from web material to which the elastic cord (not shown) is attached to the front (not shown) and is restrained at the back of the base at attachment 58. Attachment 58 can be of any known type, such as stake welding, stapling or even tightly made knots through eyelets disposed through the base 56, as will be known to those having skill in the art. The base 56 also includes a C-clip 60 which is known and typically used in conjunction with military web belts for securing accessories to the web belt. Shown in FIG. 9 is a further embodiment where the base 62 is provided with a cover 64 attached to the base 62 by a snap mechanism 66. As is readily apparent to those skilled in the art, the cover 64 goes over the user's belt in a snap-in position and held therein by snap 66. The attachment of the elastic cord is likewise provided by detachment 58.

Finally, FIG. 10 shows a base 68 using a pair of keepers 70 such as those typically used in modern military applications and which can be used to preferably attach the base 68 to a military web belt. In each of the embodiments shown in FIGS. 8, 9, and 10, it should be apparent that each utilizes a latch for metal rings on the front face thereof and the elastic cord is further provided with a metal ring lock to which is attached the end of the antler. The aforementioned description demonstrates that the method of the hunting retention system of the present invention can be accomplished in a variety of means and the present invention contemplates that other similar attaching devices can be utilized and applied to the present invention. Accordingly, the present invention is not to be limited by the description of the various attachment devices shown in FIGS. 8, 9, and 10, but rather should be deemed to include those and other types of attachment systems.

Additionally, it is contemplated in the present invention that additional elastic loops 72 can be attached near the breast of the user, for example, in the web belt system 74 shown in FIG. 11. Web belt system 74 includes shoulder harnesses 76 and web belt 78 and are typically known as load-bearing equipment or "LBEs" in the military. It is preferred that the shoulder straps of the LBE shown in FIG. 11 also have an inner and outer layer through which is provided an eyelet and into which is fixedly attached an elastic cord, as well as a proximate latch and ring lock arrangement as described above. Finally, as shown in FIG. 12, it is contemplated that the hunting retention system of the present invention can also be employed into and made part of various hunting garments, obviating a need for separate attachment devices. As shown in FIG. 12, garment 80 is provided with a pair of elastic cords 82 at each side of the user's waist to which are secured metal latches 84 that likewise can engage the metal ring lock 86 attached to each of the elastic cords. It is presently contemplated that the elastic cord 82 and metal ring lock 86, as well as the latch 84, can be secured to the external surface of the garment so that they are readily available for use. However, it is also contemplated that the elastic cord 82, latch 84, and ring lock 86 could be disposed and protected within a zipperable or enclosed compartment that could be readily opened and made accessible for use when desired.

The solutions offered by the invention herein have thus been attained in an economical, practical, and facile manner. To wit, an effective and convenient hunting retention system provides reliable access to game attractants. While preferred embodiments and example configurations of the invention have been herein illustrated, shown and described, it is to be appreciated that various changes, rearrangements and modifications may be made therein, without departing from the scope of the invention. It is intended that the specific embodiments and configurations disclosed are illustrative of the preferred and best modes for practicing the invention, and should not be interpreted as limitations on the scope of the invention and it is to be appreciated that various changes, rearrangements and modifications may be made therein, without departing from the scope of the invention.

I claim:

1. A portable device retention system comprising:
   a carrier having an inner and an outer surface, the outer surface defining an opening;
   a resilient material attached to the inner surface, wherein an end of the resilient material extends through the opening and terminates on a coupling attached to a device, the device being inwardly biased by the resilient material for elastic retention of the device; and
   a retention device disposed proximate the opening, the retention device retaining the device in close proximity to the carrier;
   wherein the carrier comprises a belt including mating ends;

wherein the mating ends comprise a buckle; and
wherein the belt comprises an inner layer including the inner surface and an outer layer including the outer surface, the inner layer further comprising hook and loop fastening material proximate the belt mating ends for securely attaching and adjusting the buckle.

2. A portable device retention system comprising:
a carrier having an inner and an outer surface, the outer surface defining an opening;
a resilient material attached to the inner surface, wherein an end of the resilient material extends through the opening and terminates on a coupling attached to a device, the device being inwardly biased by the resilient material for elastic retention of the device; and
a retention device disposed proximate the opening, the retention device retaining the device in close proximity to the carrier;
wherein the carrier comprises a belt including mating ends; and
wherein the belt is approximately 55.5 inches in length.

3. A rattling system comprising a belt having an inner and an outer layer, the outer layer defining an opening disposed proximate each of the belt ends, the opening further comprising an eyelet, the belt inner layer further comprising a hook and loop fastening material proximate the belt ends for securely attaching and adjusting a pair of buckle ends, the buckle ends further including a female and a male mating end;
an elastic cord attached to the inner layer, each end of the elastic cord extending through the opening and terminating on a circular ring of rigid material wherein each of the circular rings further include a length of string with a first end attached to the circular ring and
a second end attached to one of a pair of antlers, each one of a pair of antlers being inwardly biased by the elastic cord for elastic retention of the antlers;
a latch intermediate each of said openings for retaining each of the antlers in close proximity to the belt.

4. A portable device retention system comprising:
a carrier having an inner and an outer surface, the outer surface defining an opening;
a resilient material attached to the inner surface, wherein an end of the resilient material extends through the opening and terminates on a coupling attached to a device, the device being inwardly biased by the resilient material for elastic retention of the device; and
a retention device disposed proximate the opening, the retention device retaining the device in close proximity to the carrier;
wherein the opening comprises an eyelet for smooth transition of said resilient material.

5. The portable device retention system set forth in claim 4,
wherein the carrier comprises a belt including mating ends and the eyelet is disposed
approximately 19 inches from the mating ends.

6. The portable device retention system set forth in claim 5, wherein the coupling comprises a distal end of a closed loop.

7. The portable device retention system set forth in claim 6, wherein the coupling comprises a circular ring of rigid material.

8. The portable device retention system set forth in claim 7, wherein the coupling further includes a length of string with a first end attached to the coupling and a second end attached to the device.

9. The portable device retention system set forth in claim 6, wherein the retention device comprises a latch.

10. The portable device retention system set forth in claim 9, wherein the latch is disposed approximately 18 inches from the belt mating ends.

11. The portable device retention system set forth in claim 5, wherein the device comprises a hand tool.

12. A portable device retention system comprising:
a carrier having an inner and an outer surface, the outer surface defining an opening;
a resilient material attached to the inner surface, wherein an end of the resilient material extends through the opening and terminates on a coupling attached to a device, the device being inwardly biased by the resilient material for elastic retention of the device; and
a retention device disposed proximate the opening, the retention device retaining the device in close proximity to the carrier;
wherein the resilient material comprises an elastic cord.

13. A portable device retention system comprising:
a carrier having an inner and an outer surface, the outer surface defining an opening;
a resilient material attached to the inner surface, wherein an end of the resilient material extends through the opening and terminates on a coupling attached to a device, the device being inwardly biased by the resilient material for elastic retention of the device; and
a retention device disposed proximate the opening, the retention device retaining the device in close proximity to the carrier;
wherein the device comprises one of a pair of antlers.

14. A portable device retention system comprising:
a carrier having an inner and an outer surface, the outer surface defining an opening;
a resilient material attached to the inner surface, wherein an end of the resilient material extends through the opening and terminates on a coupling attached to a device, the device being inwardly biased by the resilient material for elastic retention of the device; and
a retention device disposed proximate the opening, the retention device retaining the device in close proximity to the carrier;
wherein the device comprises a hand tool; and
wherein the opening comprises an eyelet for smooth transition of the resilient material.

15. A portable device retention system comprising:
a carrier having an inner and an outer layer, the outer layer defining an opening;
a resilient material attached to the inner layer, wherein an end of the resilient material extends through the opening and terminates on a coupling attached to a device, the device being inwardly biased by the resilient material for elastic retention of the device; and
a retention device disposed proximate the opening, the retention device retaining the device in close proximity to the carrier.

16. The portable device retention system set forth in claim 15, wherein the opening comprises an eyelet for smooth transition of said resilient material.

17. The portable device retention system set forth in claim 15,
wherein the carrier comprises a belt including mating ends; and
wherein the belt is approximately 55.5 inches in length.

18. The portable device retention system set forth in claim 15,
wherein the device comprises one of a pair of antlers.

* * * * *